(12) United States Patent
Kim (10) Patent No.: US 7,859,618 B2
(45) Date of Patent: Dec. 28, 2010

(54) TRANSFLECTIVE TYPE LIQUID CRYSTAL DISPLAY PANEL AND METHOD OF FABRICATING THE SAME

(75) Inventor: Hyun Ho Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 373 days.

(21) Appl. No.: 11/966,836

(22) Filed: Dec. 28, 2007

(65) Prior Publication Data

US 2008/0239218 A1    Oct. 2, 2008

(30) Foreign Application Priority Data

Mar. 26, 2007   (KR) ..................... 10-2007-0029293

(51) Int. Cl.
*G02F 1/1335* (2006.01)

(52) U.S. Cl. ..................... 349/114; 349/56; 349/84; 349/113

(58) Field of Classification Search ................ 349/56, 349/84, 113, 114
See application file for complete search history.

(56) References Cited

U.S. PATENT DOCUMENTS 7,589,808 B2 * 9/2009 Ge et al. ................. 349/114

2003/0016322 A1  1/2003 Ha et al.
2005/0270453 A1  12/2005 Jung et al.
2006/0055852 A1  3/2006 Yoshida

FOREIGN PATENT DOCUMENTS

JP  2003-255375 A  9/2003

* cited by examiner

*Primary Examiner*—Jennifer Doan
(74) *Attorney, Agent, or Firm*—Birch, Stewart, Kolasch & Birch, LLP (57) ABSTRACT

A transflective type liquid crystal display panel and a method of fabricating the same are discussed. The transflective type liquid crystal display panel according to an embodiment comprises a gate line on a substrate; a data line crossing the gate line to define a pixel region comprised of a transmitting part and a reflective part; a thin film transistor adjacent to a crossing of the gate and data lines; a first insulation film on a passivation film covering the thin film transistor; a reflective electrode in the transmitting part of the pixel region, for reflecting incident light; a pixel electrode formed on a second insulation film covering the reflective electrode, and connected to a drain electrode of the thin film transistor via a contact hole; and a coupling capacitor for matching a reflective curve of the reflective part with a transmitting curve of the transmitting part.

12 Claims, 12 Drawing Sheets

TRANSFLECTIVE TYPE LIQUID CRYSTAL DISPLAY PANEL AND METHOD OF FABRICATING THE SAME

This application claims the priority benefit of Korean Patent Application No. 10-2007-0029293 filed on Mar. 26, 2007, which is hereby incorporated by reference as if fully set forth herein.

BACKGROUND OF THE INVENTION

1. Field of the Invention

Embodiments of the present invention relate to a transflective (transmitting-reflective) type liquid crystal display panel and a method of fabricating the same, and more particularly, to a transflective type liquid crystal display panel which can realize a uniform gray scale value in a pixel region by matching a reflective curve and a transmitting curve through a coupling capacitor in a reflective part of pixel region.

2. Discussion of the Related Art

Generally, a liquid crystal display (LCD) device displays images by controlling light transmittance of liquid crystal with the use of electric field. This liquid crystal display device is largely classified into a vertical electric field applying mode and a horizontal electric field applying mode according to a direction of electric field to drive liquid crystal.

The vertical electric field applying mode liquid crystal display device drives liquid crystal of Twisted Nematic TN mode by a vertical electric field between a common electrode on an upper substrate and a pixel electrode on a lower substrate, wherein the common electrode faces with the pixel electrode. This vertical electric field applying mode liquid crystal display device has an advantage of high aperture ratio, while it has a disadvantage of narrow viewing angle.

The horizontal electric field applying mode liquid crystal display device drives liquid crystal of In-Plane Switching IPS mode by a horizontal electric field between the pixel and common electrodes formed on the lower substrate. This horizontal electric field applying mode has an advantage of wide viewing angle.

Also, the liquid crystal display device may be largely classified into a transmitting type liquid crystal display device using light generated from a backlight unit, and a reflective type liquid crystal display device using ambient and surrounding light. The transmitting type liquid crystal display device has a disadvantage of large power consumption. The reflective type liquid crystal display device can not display desired images in the dark surroundings because the reflective type liquid crystal display device uses the ambient and surrounding light.

To overcome these problems, there are studies and developments for a transflective (transmitting reflective) type liquid crystal display device. The transflective type liquid crystal display device can be operated by both a transmitting mode and a reflective mode since the transflective type liquid crystal display device is provided with both a transmitting part and a reflective part, to thereby use both the transmitting light from the backlight unit and the ambient and surrounding light. That is, the transflective type liquid crystal display device is operated by the reflective mode if there is a sufficient amount of ambient and surrounding light. Meanwhile, the transflective type liquid crystal display device is operated by the transmitting mode using the transmitting light generated from the backlight unit if there is an insufficient amount of ambient and surrounding light. Thus, the transflective type liquid crystal display device can decrease the power consumption as compared with that of the transmitting type liquid crystal display device. In addition, unlike the reflective type liquid crystal display device, the transflective type liquid crystal display device is free from limitations of the ambient and surrounding light.

Hereinafter, a related art transflective type liquid crystal display device and a structure and operation thereof will be explained with reference to FIG. 1.

Figure 1:
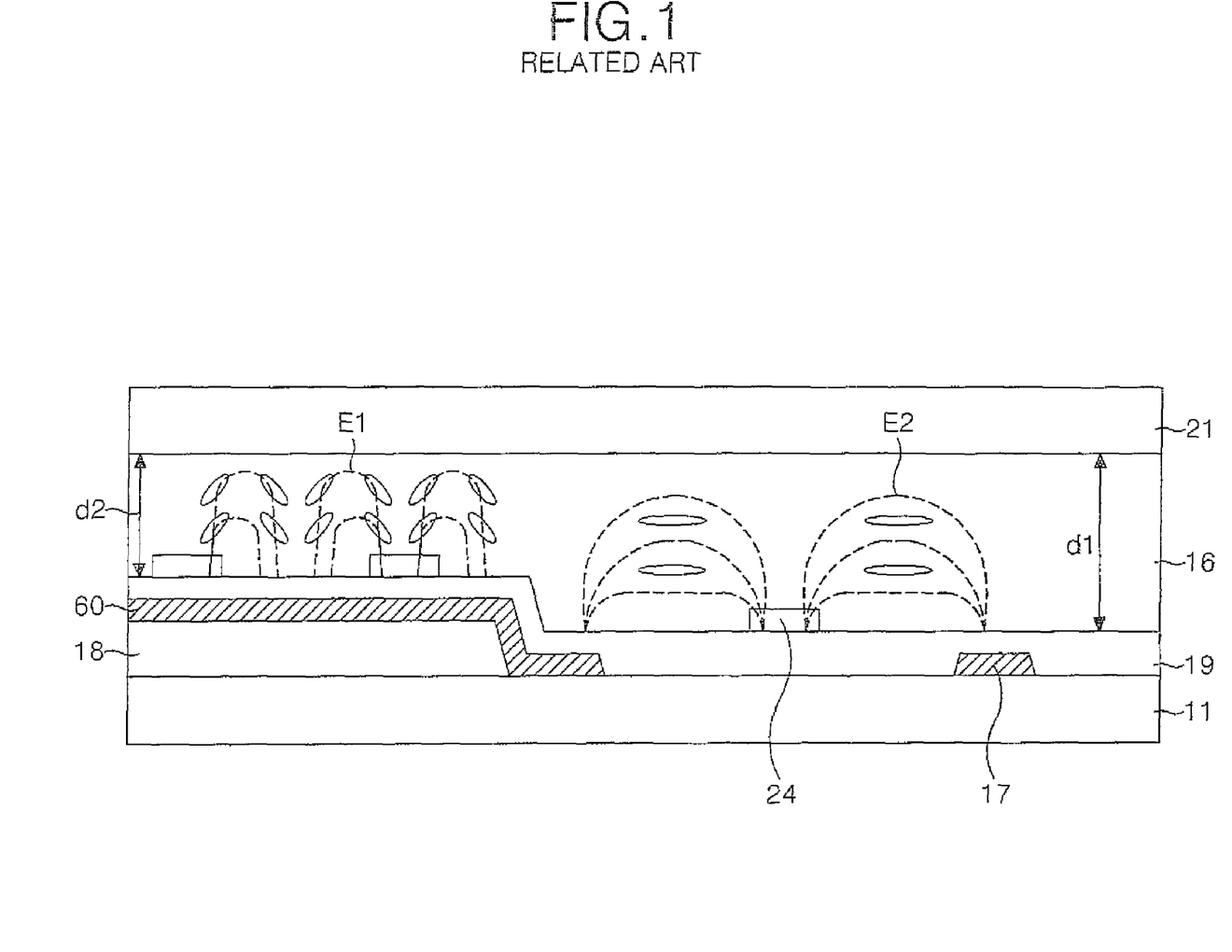
FIG. 1 is a cross section diagram illustrating a transflective type liquid crystal display panel having a dual cell gap structure according to the related art.

As shown in FIG. 1, the related art transflective type liquid crystal display device includes a transmitting part and a reflective part in each pixel region, which is driven by both a vertical electric field and a horizontal electric field. As shown in FIG. 1, the transflective type liquid crystal display device is comprised of a thin film transistor substrate 11 including a plurality of lines and thin film transistors; a color filter substrate 21 facing the thin film transistor substrate 11; and a liquid crystal layer 16 formed between the thin film transistor substrate 11 and the color filter substrate 21.

The thin film transistor substrate 11 includes gate and data lines crossing each other to define a pixel region; a thin film transistor formed adjacent to a crossing portion of the gate and data lines; an organic insulation film 18 formed in the reflective part; a reflective electrode 6, formed on the organic insulation film 18, for reflecting incident light from the external; a pixel electrode 17 formed as the same layer as the reflective electrode 60 in the transmitting part; a passivation film 19 for covering the reflective electrode 60 and the pixel electrode 17; and a common electrode 24, formed on the passivation film 19, for forming a horizontal electric field with the pixel electrode 17.

At this time, the related art transflective type horizontal electric field mode liquid crystal display device has a cell gap in the transmitting part, which is about twice as large as a cell gap in the reflective part due to the organic insulation film 60 formed in the reflective part, so that it is possible to compensate for a phase difference between the reflective part and the transmitting part, thereby achieving the uniform luminance property in the pixel region.

To form the dual cell gap structure for achievement of the uniform luminance property in the pixel region, it requires an additional step for forming the organic insulation film 60 in the reflective part, thereby causing the complicated process and low efficiency.

In order to solve the problem of the transflective type liquid crystal display device having the dual cell gap structure, there are studies and researches for a transflective type liquid crystal display device having a single cell gap structure by removing a step difference between the transmitting and reflective parts of the pixel region with the use of an organic insulation material having the great step-difference compensation property.

Figure 2:
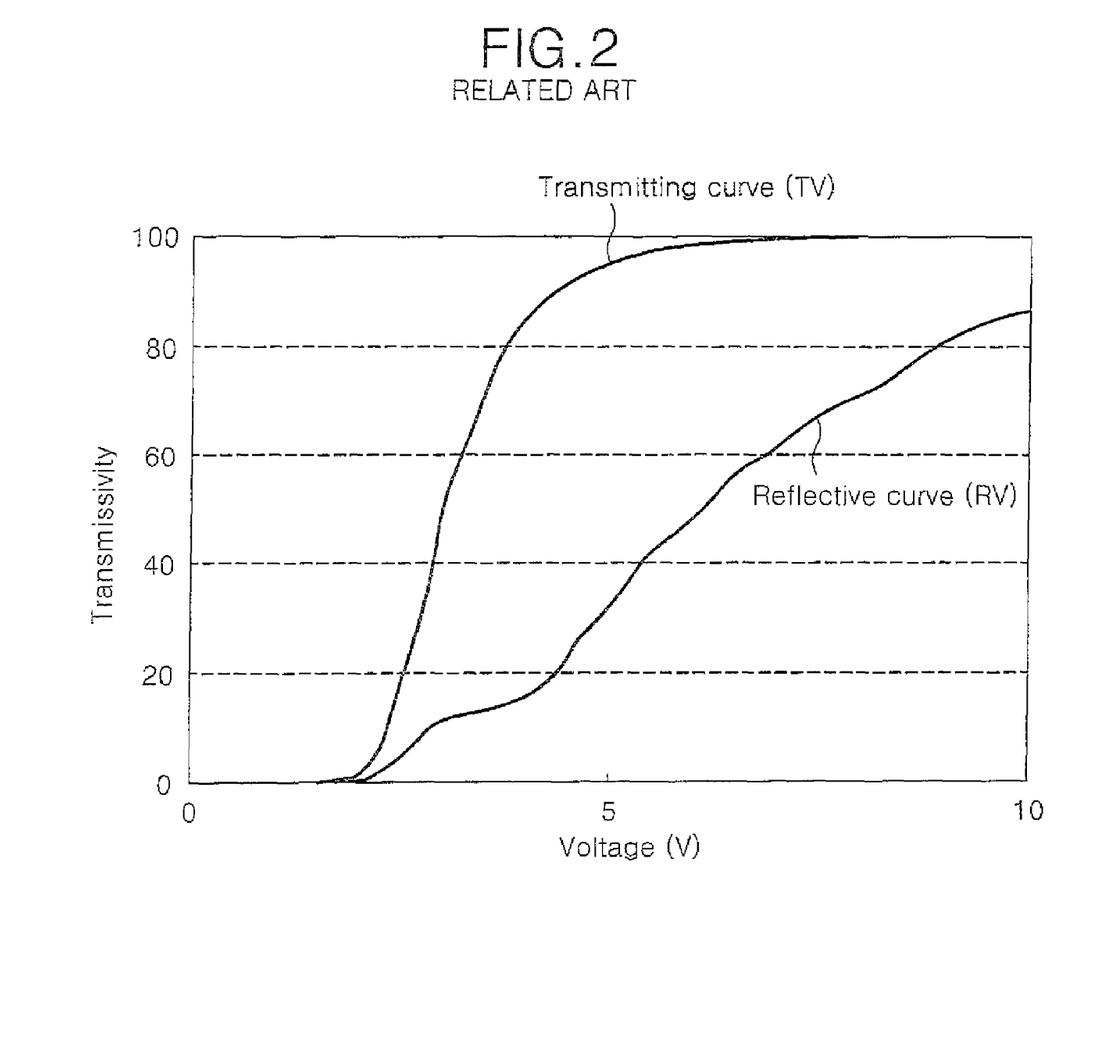
FIG. 2 is a graph illustrating a transmitting curve and a reflective curve in a transflective type liquid crystal display panel having a single cell gap structure according to the related art.

In case of the transflective type liquid crystal display device having the single cell gap structure, as shown in FIG. 2, a reflective curve of reflective part and a transmitting curve of transmitting part are not matched up due to a difference of effective refraction index of liquid crystal between the reflective part and the transmitting part. Accordingly, it is difficult to match up the reflective curve of reflective part and the transmitting curve of transmitting part in the related art transflective type liquid crystal display panel having the single cell gap structure, whereby the reflective part and the transmitting part for constituting the pixel region have the different gray scales.

SUMMARY OF THE INVENTION

Accordingly, the present invention is directed to a transflective type liquid crystal display panel and a method of fabricating the same that substantially obviates one or more problems due to limitations and disadvantages of the related art.

An object of the present invention is to provide a transflective type liquid crystal display panel which can form a uniform gray scale in a pixel region by matching up a reflective curve and a transmitting curve through a coupling capacitor in a reflective part of pixel region.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a transflective type liquid crystal display panel comprises a gate line on a substrate; a data line crossing the gate line to define a pixel region comprised of a transmitting part and a reflective part; a thin film transistor adjacent to a crossing of the gate and data lines; a first insulation film on a passivation film covering the thin film transistor; a reflective electrode in the transmitting part of the pixel region, for reflecting incident light; a pixel electrode formed on a second insulation film covering the reflective electrode, and connected to a drain electrode of the thin film transistor via a contact hole; and a coupling capacitor for matching a reflective curve of the reflective part with a transmitting curve of the transmitting part by normalizing the reflective curve of reflective part according to a data voltage supplied from the drain electrode.

At this time, the first insulation film is formed of an organic insulation material of photo-acryl.

Also, the second insulation film is formed of an inorganic insulation material.

The coupling capacitor comprises a first coupling capacitor including the reflective electrode, and the drain electrode overlapping with the reflective electrode in state of interposing the first insulation film therebetween; and a second coupling capacitor including the pixel electrode, and the reflective electrode overlapping with the pixel electrode in state of interposing the second insulation film therebetween.

The first and second coupling capacitors are connected in parallel.

Also, electric capacity of the second coupling capacitor is varied based on an area of the pixel electrode formed in the reflective part.

In another aspect, a method of fabricating a transflective type liquid crystal display panel comprises forming a gate line on a substrate; forming a data line crossing the gate line to define a pixel region comprised of a transmitting part and a reflective part; forming a thin film transistor adjacent to a crossing of the gate and data lines; forming a first insulation film on a passivation film covering the thin film transistor; forming a reflective electrode, for reflecting incident light, in the transmitting part of the pixel region; forming a pixel electrode connected to a drain electrode of the thin film transistor via a contact hole included in the second insulation film covering the reflective electrode; and forming a coupling capacitor to normalize a reflective curve of the reflective part according to a data voltage supplied from the drain electrode, to be matched up with a transmitting curve of the transmitting part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a transflective type liquid crystal display panel according to the present invention and a method of fabricating the same will be described with reference to the accompanying drawings.

A structure and operation of transflective type liquid crystal display panel according to the present invention will be explained with reference to FIGS. 3 and 4.

Figure 3:
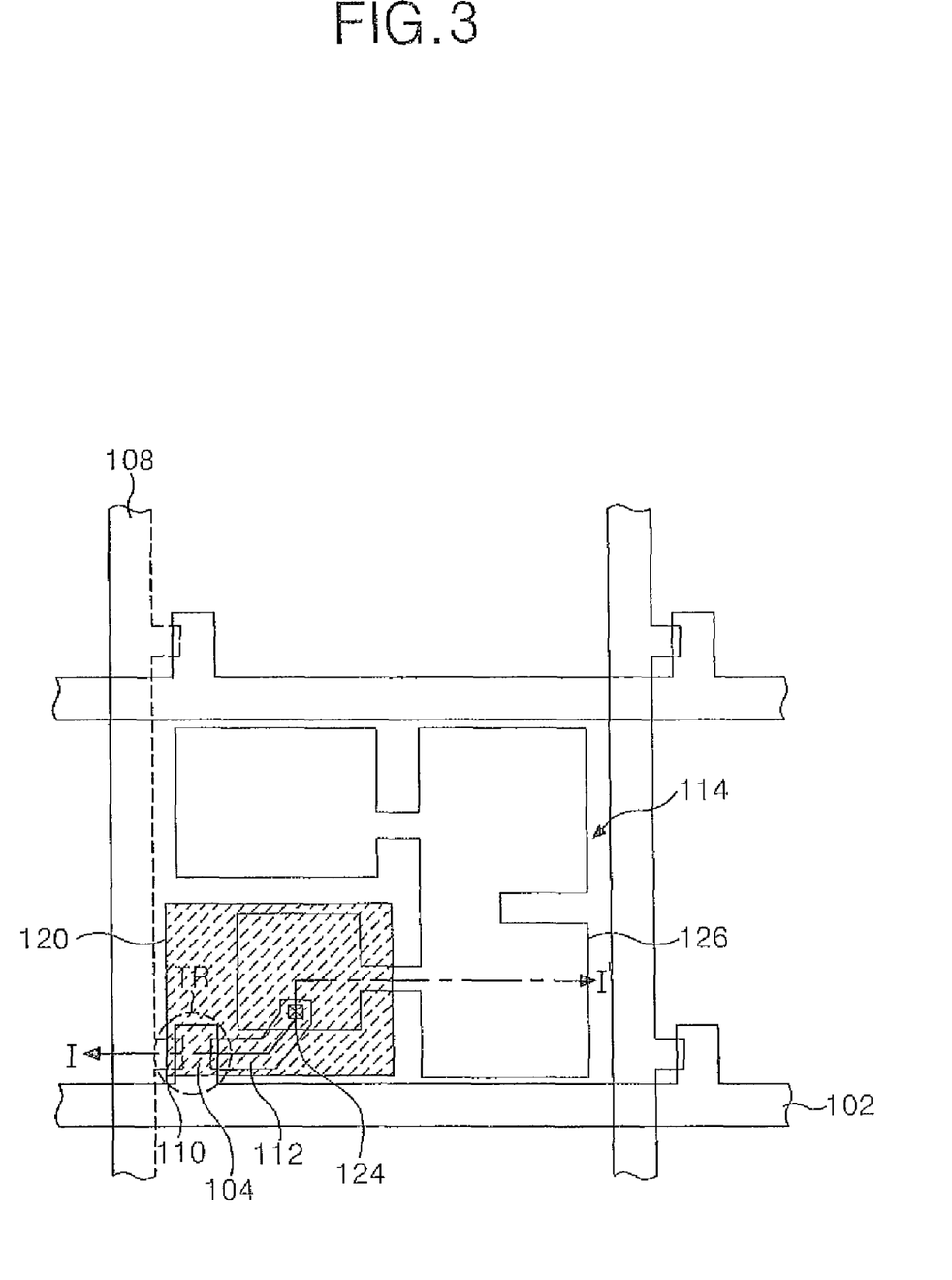
FIG. 3 is a plan diagram illustrating a transflective type liquid crystal display panel according to the present invention.
Figure 4:
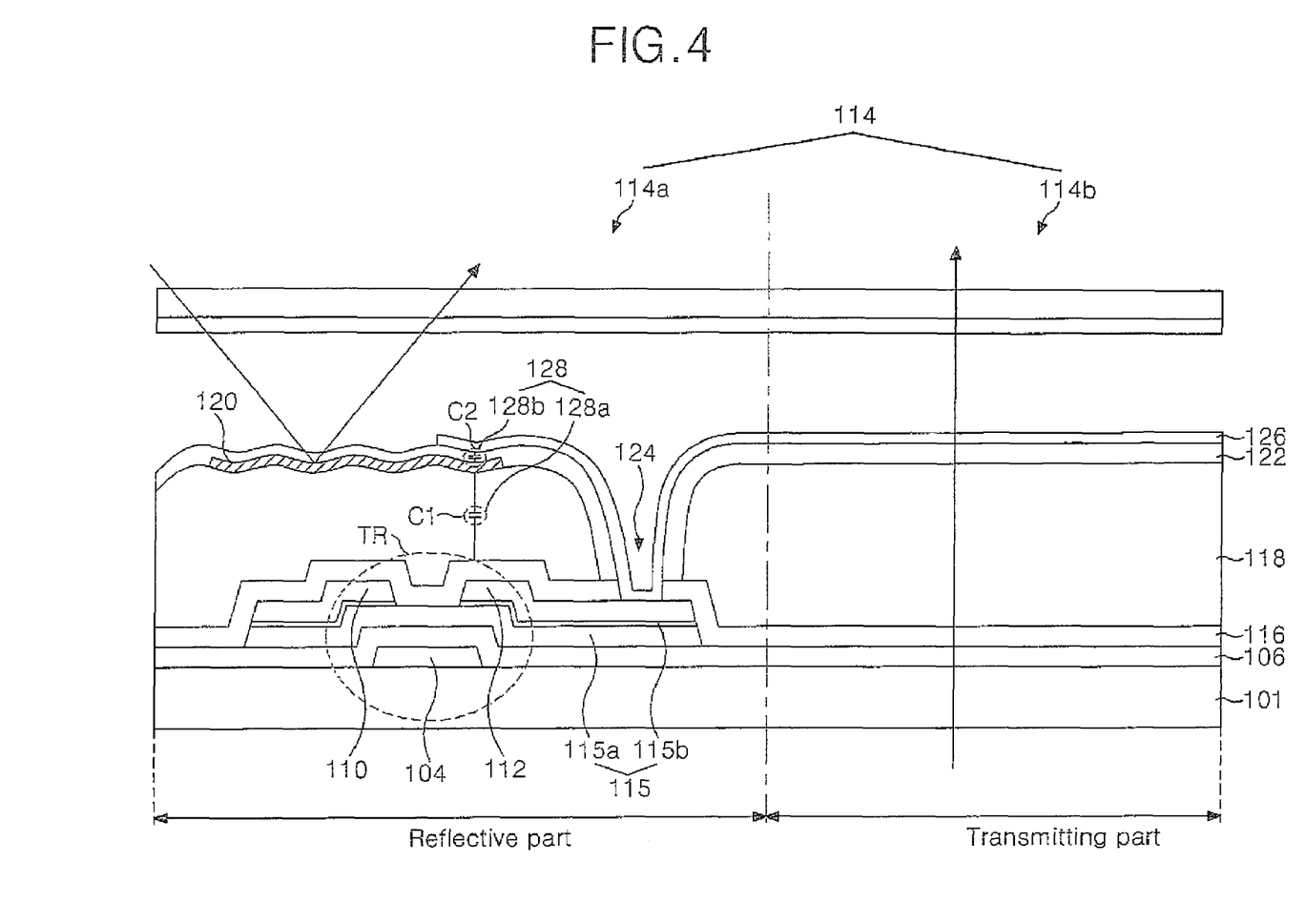
FIG. 4 is a cross section diagram illustrating a transflective type liquid crystal display panel along I-I' of FIG. 3.

As shown in FIGS. 3 and 4, the transflective type liquid crystal display panel according to the present invention includes a gate line 102 on a substrate 102; a data line 108 crossing the gate line 102 to define a pixel region comprised of a transmitting part and a reflective part therein; a thin film transistor TR adjacent to a crossing of the gate and data lines 102 and 108; a first insulation film 118 on a passivation film 116 covering the thin film transistor TR; a reflective electrode 120, formed in the transmitting part of the pixel region, for reflecting incident light; a pixel electrode 126 formed on a second insulation film 122 for covering the reflective electrode 120 and connected to the thin film transistor TR via a contact hole 124; and a coupling capacitor 128 for normalizing a reflective curve of reflective part to be matched with a transmitting curve of transmitting part by charging or discharging a data voltage supplied from a storage capacitor.

The gate line 102 supplies a gate signal to a gate electrode 104 included in the thin film transistor TR, wherein the gate signal is supplied from a gate driver (not shown) being in contact with a gate pad. Also, the data line 108 supplies a data signal to source and drain electrodes 110 and 112 of the thin film transistor TR in association with an operation of turning-on/off the gate electrode 104, wherein the data signal is supplied from a data driver (not shown) being in contact with a data pad. The data line 108 crosses the gate line 102 with a gate insulation film 106 interposed therebetween, to thereby define the pixel region 114 comprised of the reflective part 114a and the transmitting part 114b.

The thin film transistor TR charges the pixel electrode 126 with a pixel signal in response to the gate signal of the gate line 102. The thin film transistor TR includes the gate electrode 104 connected to the gate line 102; the source electrode 110 connected to the data line 108; and the drain electrode 112 being opposite to the source electrode 110 in state of interposing a channel therebetween, and connected to the pixel electrode 126 via the contact hole 124.

In addition, the thin film transistor TR includes a semiconductor pattern 115, wherein the semiconductor pattern 15 includes an active layer 115a which is formed above the gate electrode 104 with the gate insulation film 106 interposed therebetween, and an ohmic contact layer 115b which is formed on the active layer 115a and is ohmic-contact with the source electrode 110 and the drain electrode 112.

The reflective electrode 120 reflects the external light being incident on a color filter substrate to the color filter, wherein the reflective electrode 120 is formed on the first insulation film 118 for covering the reflective part 114a of the pixel region 114 having the thin film transistor TR. At this time, the reflective electrode 120 overlaps with the drain electrode 112 of the thin film transistor TR in state of interposing the first insulation film 118 therebetween. The reflective electrode 120 forms a first coupling capacitor 128a for the coupling capacitor 128 in the reflective part 114a of the pixel region 114.

The first insulation film 118 is formed of an insulation material, for example, photo-acryl having good planarization property. Also, the first insulation film 118 has the surface with embossing patterns to disperse the incident light from the color filter substrate, thereby improving the reflection efficiency. According as the first insulation film 118 is formed of the organic insulation material such as photo-acryl, the first coupling capacitor 128a has low electric capacity, whereby there is rapid charging or discharging for the data voltage input from the storage capacitor Cst, thereby forming a reflective curve RV which is rapidly changed in the reflective part 114a of the pixel region 114.

The pixel electrode 126 is formed on the second insulation film 122 for covering the reflective electrode 120, and forms the vertical electric field for alignment of liquid crystal with the common electrode. Also, the pixel electrode 126 is electrically connected with the drain electrode 112 of the thin film transistor TR via the contact hole 124 passing through the second insulation film 122, the first insulation film 118 and the passivation film 116. The pixel electrode 126 overlaps with the reflective electrode 120 in state of interposing the second insulation film 122 of inorganic insulation material, to thereby form a second coupling capacitor 128b for the coupling capacitor 128 in the reflective part 114a of the pixel region 114.

According as the second insulation film 122 is formed of the inorganic insulation material, the second coupling capacitor 128b has high electric capacity, whereby there is slow charging or discharging for the data voltage supplied from the storage capacitor Cst, thereby forming a reflective curve RV which is gently changed in the reflective part 114a of the pixel region 114.

The electric capacity of second coupling capacitor 128b can be controlled by varying an overlapping area of the pixel electrode 126 with the reflective electrode in state of interposing the second insulation film 122 therebetween, for example, an area formed in the reflective part 114a of the pixel region 114.

Figure 5:
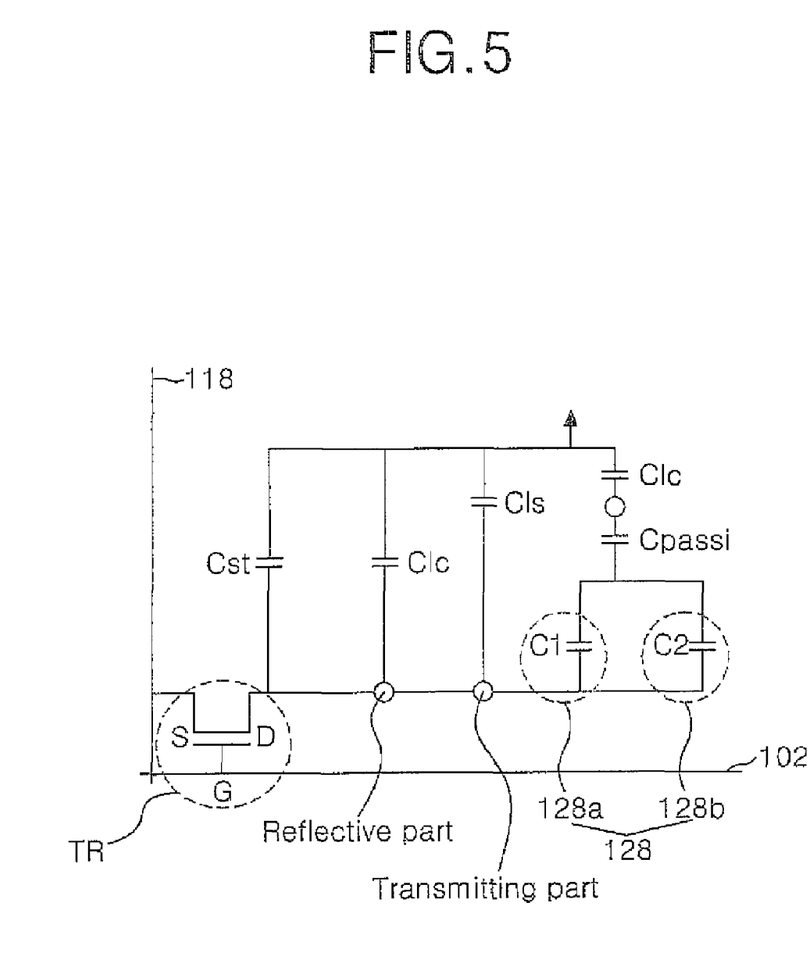
FIG. 5 is an equivalent circuit diagram illustrating a transflective type liquid crystal display panel according to the present invention.

The coupling capacitor 128 matches the reflective curve of reflective part 114a with the transmitting curve of transmitting part 114b by normalizing the reflective curve of reflective part 114a with the control for charging or discharging the data voltage supplied from the storage capacitor Cst. As shown in FIG. 5, the coupling capacitor 128 is comprised of at least two capacitors (hereinafter, referred to as first and second coupling capacitors) connected in parallel in the reflective part 114a of the pixel region 114.

At this time, the first coupling capacitor 128a includes the reflective electrode 120 formed in the reflective part 114a of the pixel region 114; and the drain electrode 112 of the thin film transistor TR overlapping with the reflective electrode 120 in state of interposing the first insulation film 118 of organic insulation material such as photo-acryl. According as the first insulation film 118 is formed of the organic insulation material such as photo-acryl, the first coupling capacitor 128a has the low electric capacity. Accordingly, as shown in FIG. 5, there is rapid charging or discharging for the data voltage supplied from the storage capacitor Cst, thereby forming the reflective curve RV1 which is changed rapidly in the reflective part 114a of the pixel region 114.

The second coupling capacitor 128b is comprised of the pixel electrode 126 formed in the reflective part 114a of the pixel region 114; and the reflective electrode 120 overlapping with the pixel electrode 126 in state of interposing the second insulation film 122 of inorganic insulation material. As the second insulation film 122 is formed of the thin inorganic insulation layer, the second coupling capacitor 128b has the high electric capacity. Accordingly, as shown in FIG. 5, there is slow charging or discharging for the data voltage supplied from the storage capacitor Cst, thereby forming the reflective curve RV2 which is gently changed in the reflective part 114a of the pixel region 114.

Figure 6:
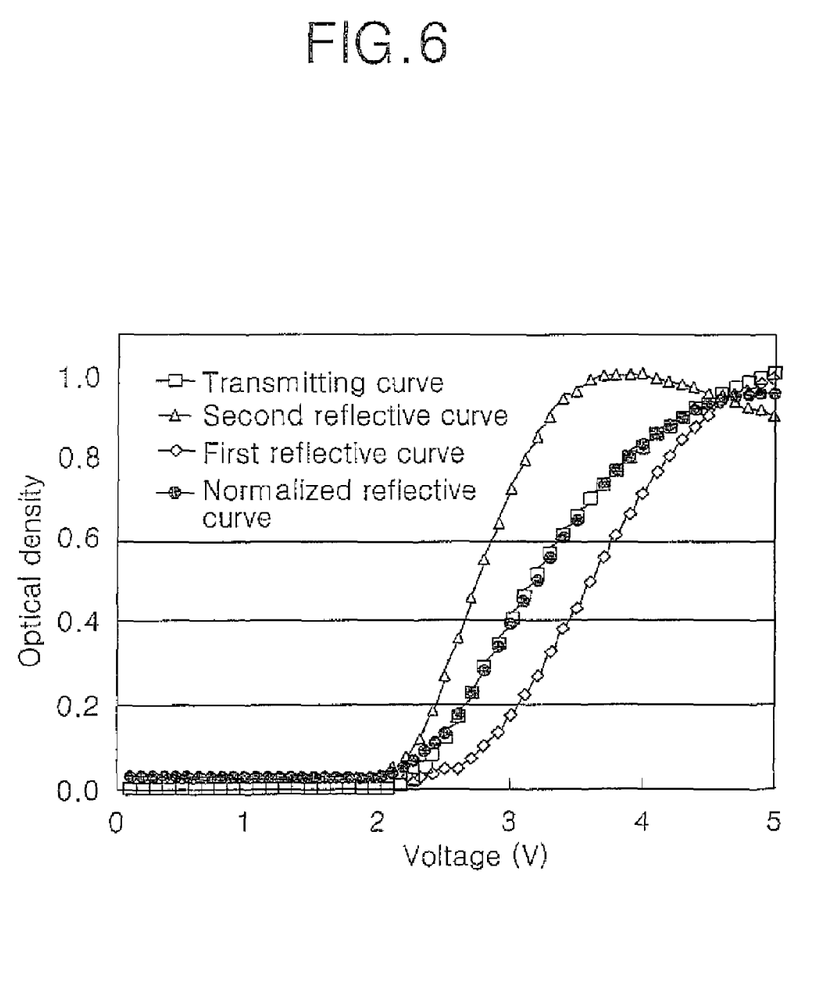
FIG. 6 is a graph illustrating a relation between a transmitting curve of transmitting part and a normalized reflective curve of reflective part included in a pixel region of a transflective type liquid crystal display panel according to the present invention.

As mentioned above, the coupling capacitor 128 is comprised of the first and second coupling capacitors which are connected to each other in parallel. As shown in FIG. 6, the first and second reflective curves formed by charging or discharging the data voltage supplied to the reflective part 114a of the pixel region 114 are normalized so that the first and second reflective curves are matched with the transmitting curve formed in the transmitting part 114b of the pixel region 114. According as the reflective curve of reflective part 114a is matched with the transmitting curve of transmitting part 114b by normalizing the reflective curve of reflective part 114a through the coupling capacitor 128 in the reflective part 114a of the pixel region 114, the gray scale value is uniformed in the reflective part 114a and the transmitting part 114b included in the pixel region 114.

FIGS. 7A to 7F are cross section diagrams illustrating a method of fabricating a transflective type liquid crystal display panel according to the present invention.

Figure 7A:
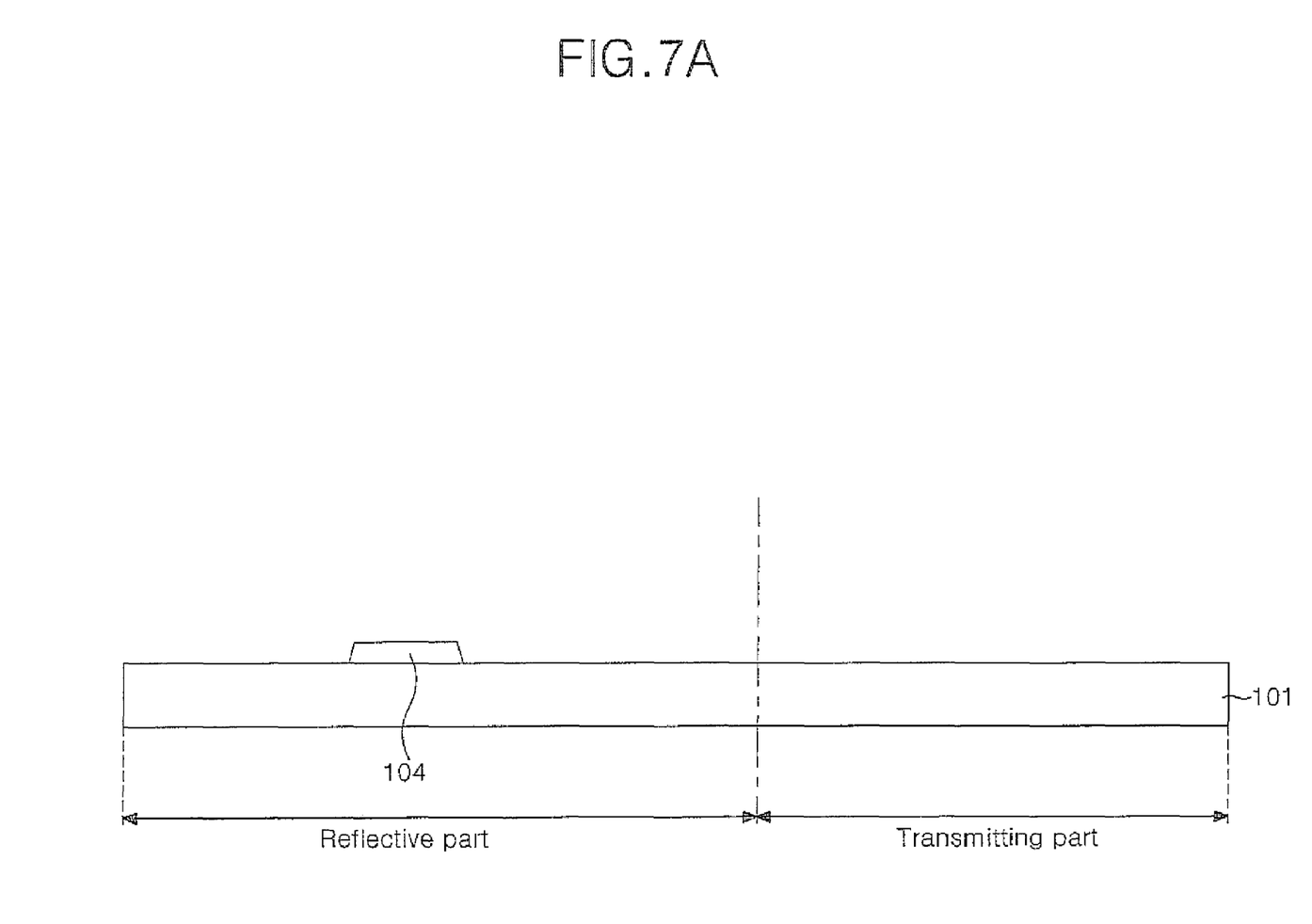
FIGS. 7A to 7F are cross section diagrams illustrating a method of fabricating a transflective type liquid crystal display panel according to the present invention.

As shown in FIG. 7A, a first conductive pattern including the gate line 102 and the gate electrode 104 is formed on a substrate 101 by a first mask process. More specifically, a gate metal layer is formed on the substrate 101 by sputtering. At this time, the gate metal layer may be formed in a single-layered structure including at least one of aluminum-based metal, copper Cu, chrome Cr and molybdenum Mo, or in a double-layered structure including aluminum/neodymium AlNd and molybdenum sequentially deposited.

After coating photoresist on an entire surface of the substrate 101 including the gate metal layer, photolithography using a first mask is carried out, to thereby form a photoresist pattern to expose other portions except a predetermined portion for the first conductive pattern in the gate metal layer. After etching the gate metal layer exposed by the photoresist pattern, an ashing process is performed to the remaining photoresist pattern. Thus, the first conductive pattern is completed on the substrate 101, which includes the gate line 102, and the gate electrode 104 connected to the gate line 102.

Figure 7B:
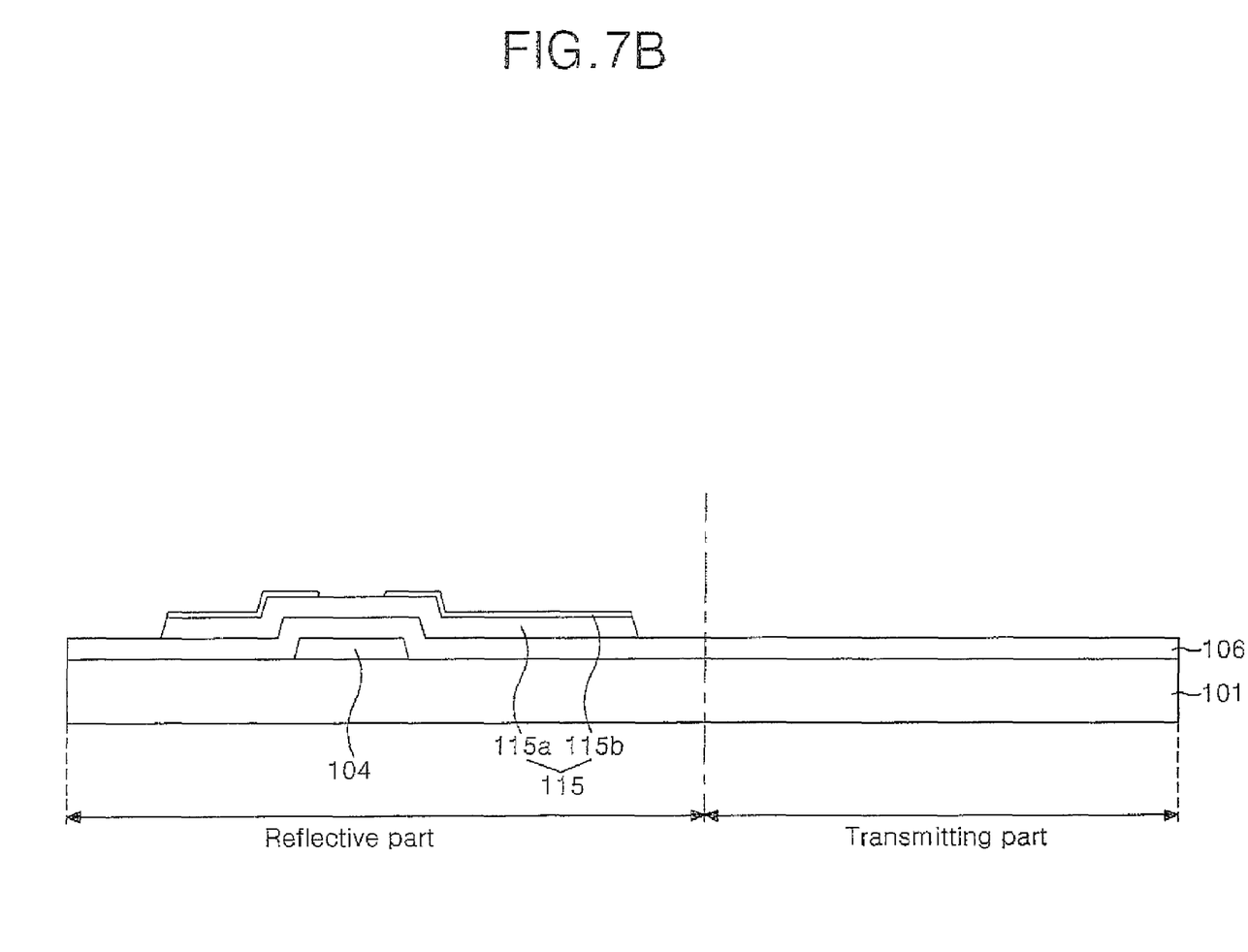

Referring to FIG. 7B, through a second mask process, the semiconductor pattern 115 for formation of the channel and ohmic contact is formed on the gate insulation film 106 covering the first conductive pattern. More specifically, the gate insulation film 106 is formed on the entire surface of the substrate 101 including the first conductive pattern, and the semiconductor layer comprised of a-Si layer and $n^+$-silicon layer is formed on the gate insulation film 106. After photoresist is coated on the entire surface of the semiconductor layer, photolithography using a second mask is carried out, to thereby form a photoresist pattern to expose the semiconductor layer formed in other portions except the channel region of the thin film transistor TR. At this time, the semiconductor layer exposed by the photoresist pattern is etched sequentially, and the remaining photoresist pattern is removed, thereby forming the semiconductor pattern 115 comprised of the active layer 115a for formation of the channel, and the ohmic contact layer 115b for the ohmic contact.

Figure 7C:
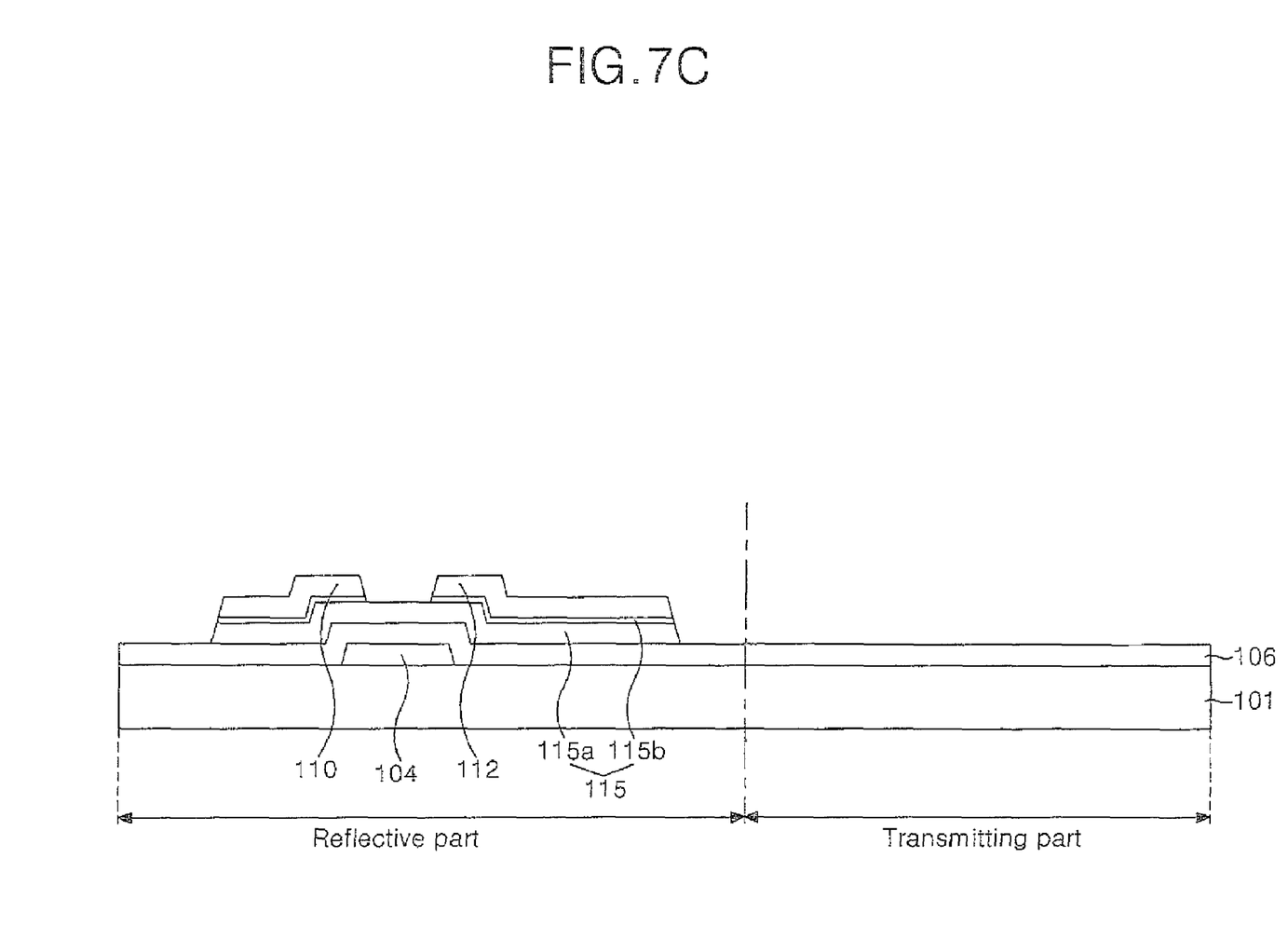

As shown in FIG. 7C, through a third mask process, a second conductive pattern including the data line 108, the source electrode 110 connected to the data line 108, and the drain electrode 112 is formed on the substrate 101 including the semiconductor pattern 115.

This will be explained in detail as follows. First, a data metal layer is deposited on the entire surface of the gate insulation film 106 including the semiconductor pattern 115. After coating photoresist on the entire surface of the data metal layer, photolithography using a third mask is carried out, to thereby form a photoresist pattern to expose other portions except a predetermined portion for the second conductive pattern in the data metal layer. After etching the data metal layer exposed by the photoresist pattern, the remaining photoresist pattern is ashed to thereby form the second conductive pattern comprised of the data line 108, the source electrode 110 connected to the data line 108, and the drain electrode 112 being opposite to the source electrode 110 with the channel positioned therebetween. At this time, the semiconductor pattern and the second conductive pattern may be formed at the same time by a half-tone mask or a diffraction exposure mask.

Figure 7D:
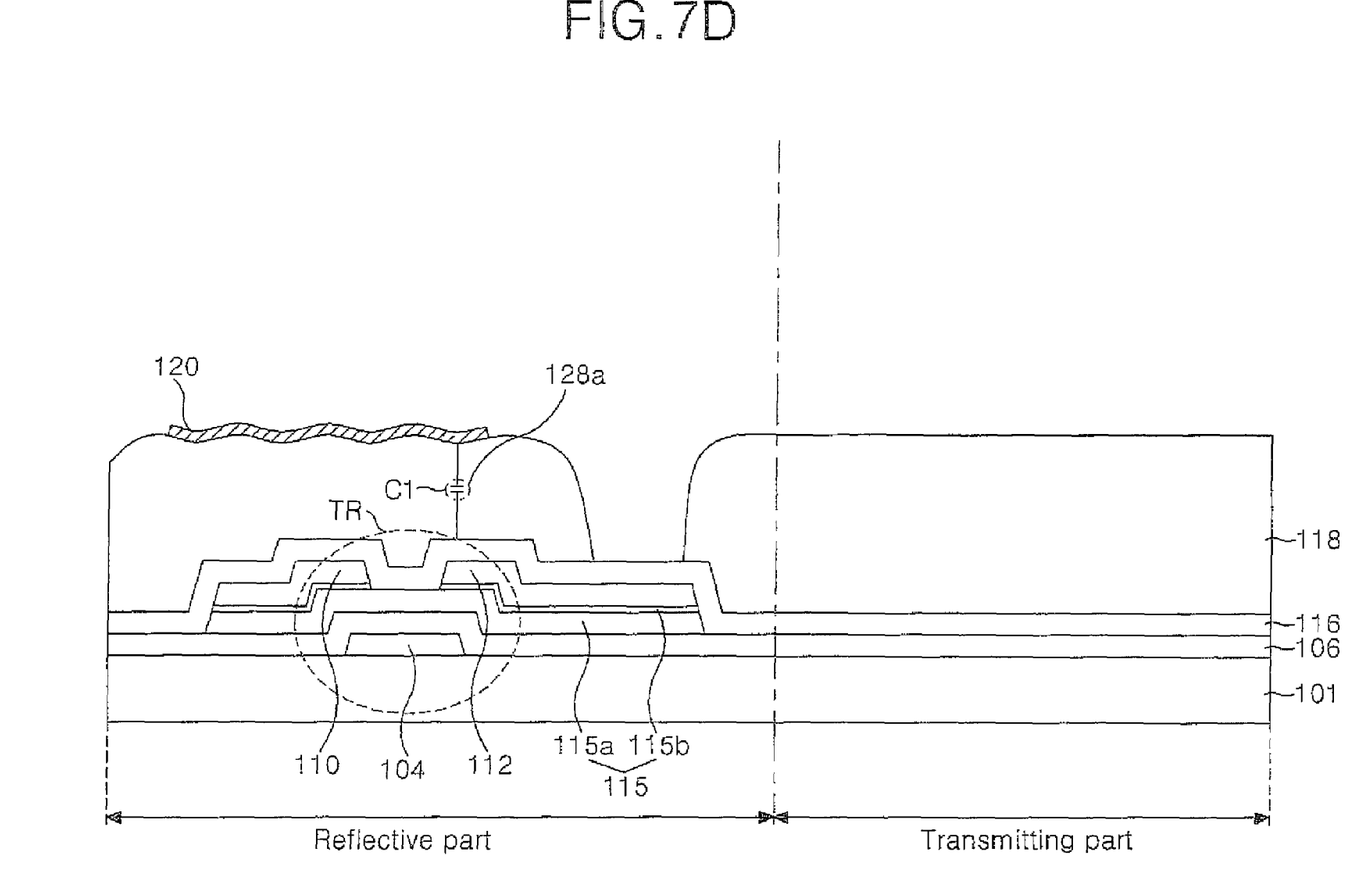

As shown in FIG. 7D, the reflective electrode 120 for reflecting the light is formed in the reflective part 114a of the pixel region 114 by a fourth mask process. In more detail, the passivation film 116 and the first insulation film 118 are formed on the entire surface of the substrate 101 including the second conductive pattern. At this time, the passivation film 116 is formed of the inorganic insulation material such as silicon nitride, and the first insulation film 118 is formed of the organic insulation material such as photo-acryl.

After forming a reflective metal layer on the first insulation film 118, photolithography using a fourth mask is carried out, thereby forming a photoresist pattern to expose other portions except a predetermined portion for forming the reflective electrode 120 in the reflective metal layer. At this time, the reflective metal layer is formed of metal having the good reflectivity, for example, aluminum Al, copper Cu, or chrome Cr.

After etching the reflective metal layer exposed by the photoresist pattern, an ashing process is performed to the remaining photoresist pattern, to thereby form the reflective electrode 120, for reflecting the light to the color filter substrate, on the first insulation film 118 covering the reflective part 114a of the pixel region 114. At this time, the reflective electrode 120 overlaps with the drain electrode 112 of the thin film transistor TR in state of interposing the first insulation film 118 therebetween, thereby forming the first coupling capacitor 128a in the reflective part 114a of the pixel region 114. According as the first insulation film 118 is formed of the inorganic insulation material having the good planarization property, for example, photo-acryl, the first coupling capacitor 128a formed by the reflective electrode 120 performs the rapid charging or discharging for the data voltage supplied from the storage capacitor Cst, thereby forming the reflective curve which is rapidly changed in the reflective part 114a of the pixel region 114.

Figure 7E:
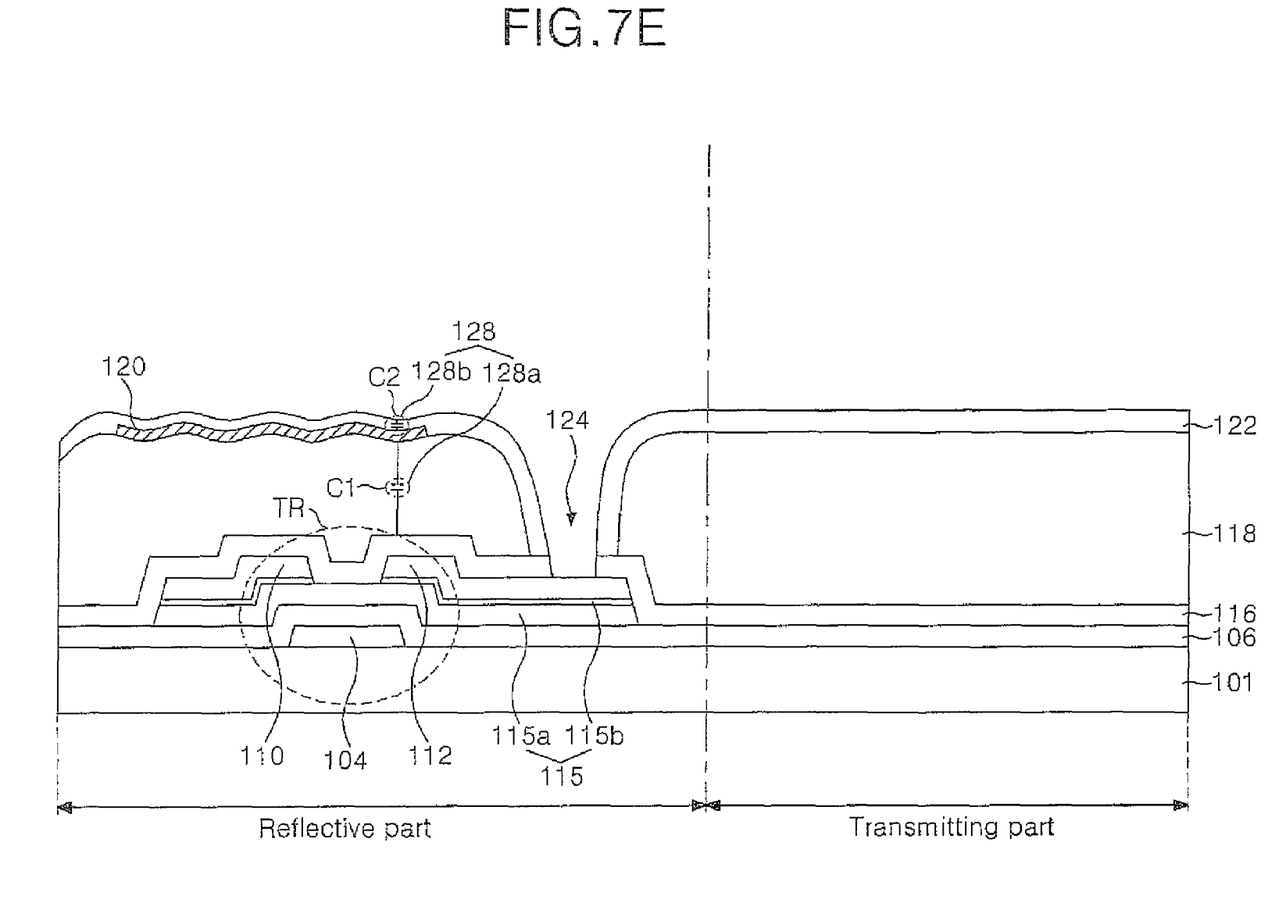

As shown in FIG. 7E, a fifth mask process is performed to form the contact hole 124 for exposing the drain electrode 112 of the thin film transistor TR. More specifically, the second insulation film 122 is formed on the entire surface of the substrate 101 including the reflective electrode 120 in the reflective part 114a of the pixel region 114. After coating photoresist on the entire surface of the second insulation film 122, photolithography using a fifth mask is carried out, to thereby form a photoresist pattern to expose a predetermined portion for the contact hole 124 in the second insulation film 122.

After sequentially etching the second insulation film 122, the first insulation film 118 and the passivation film 116 exposed by the photoresist pattern, an ashing process is performed to the remaining photoresist pattern, thereby forming the contact hole 124 passing through the second insulation film 122, the first insulation film 118 and the passivation film 116 to expose the drain electrode 112 of the thin film transistor TR.

Figure 7F:
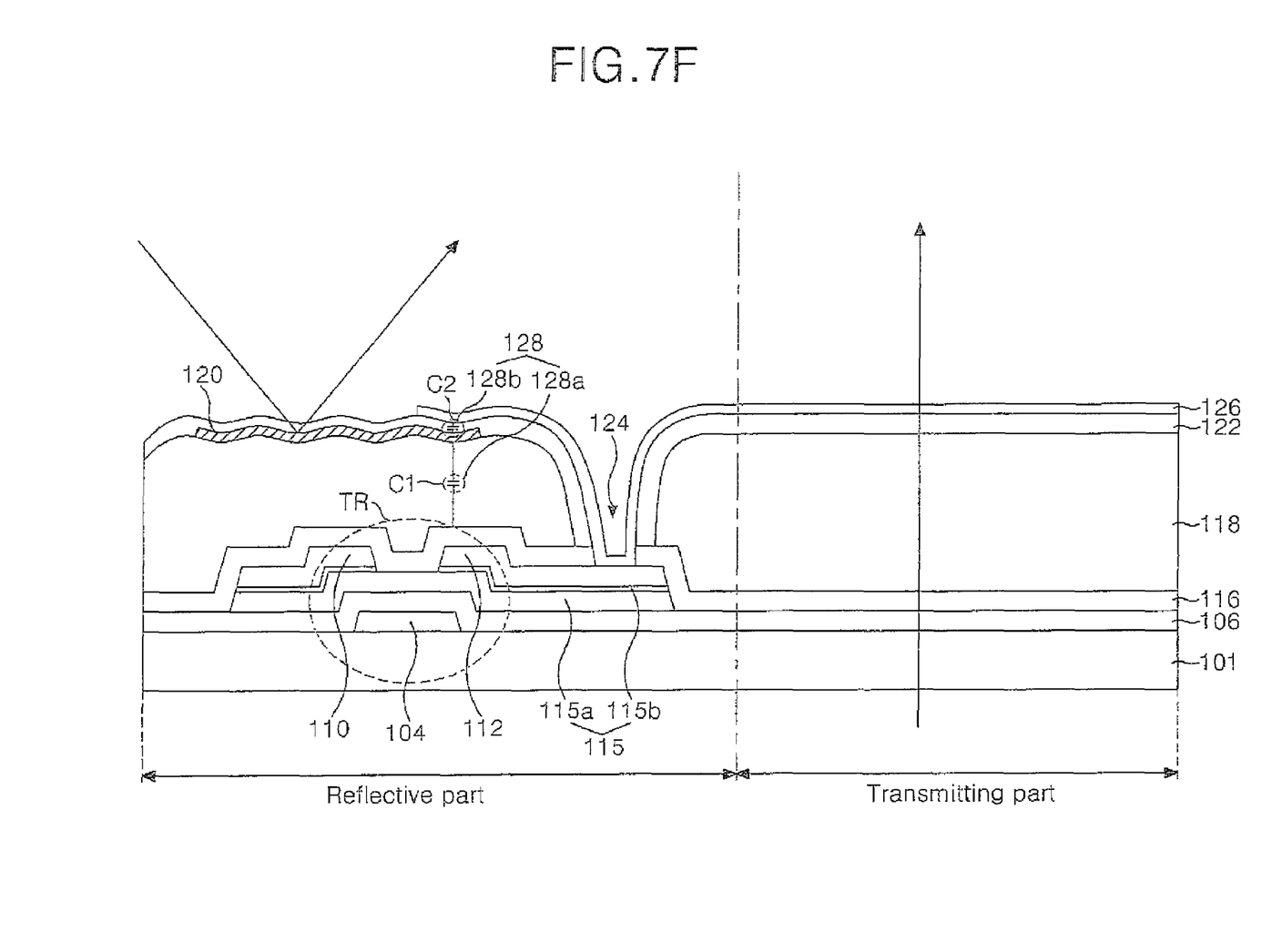

As shown in FIG. 7F, a sixth mask process is performed to form the pixel electrode 126 in the pixel region 114, wherein the pixel electrode 126 forms the vertical electric field for alignment of the liquid crystal together with the common electrode. More specifically, a transparent conductive layer ITO is deposited on the entire surface of the second insulation film 122 by PECVD. Then, photoresist is coated on the transparent conductive layer ITO, and photolithography using a sixth mask is carried out, to form a photoresist pattern to expose other portions except a predetermined portion for the pixel electrode 126 in the transparent conductive layer ITO. After etching the transparent conductive layer ITO exposed by the photoresist pattern, an ashing process is performed to the remaining photoresist pattern, thereby forming the pixel electrode 126 in the pixel region 114 to form the vertical electric field for alignment of the liquid crystal disposed in the cell gap together with the common electrode.

At this time, the pixel electrode 126 is connected to the drain electrode 112 of the thin film transistor TR via the contact hole 124 passing through the second insulation film 122, the first insulation film 118 and the passivation film 116. In association with the data voltage supplied through the drain electrode 112, the pixel electrode 126 and the common electrode form the vertical electric field for alignment of the liquid crystal.

Also, the pixel electrode 126 overlaps with the reflective electrode 120 in state of interposing the second insulation film 122 therebetween, thereby forming the second coupling capacitor 128b for the coupling capacitor 128 in the reflective part 114a of the pixel region 114. At this time, the electric capacity of the second coupling capacitor 128b may be variable based on the overlapping area of pixel electrode 126 with the reflective electrode 120 in state of interposing the first insulation film 118 therebetween.

According as the second insulation film 122 is formed of the organic insulation material, the second coupling capacitor 128b has the large electric capacity. Thus, the second coupling capacitor 128b performs the slow charging or discharging for the data voltage supplied from the storage capacitor Cst, thereby forming the reflective curve which is gently changed in the reflective part 114a of the pixel region 114.

As shown in FIG. 5, since the first and second coupling capacitors 128a and 128b are connected in parallel, the reflective curve in the reflective part 114a of the pixel region 114 is normalized to be matched with the transmitting curve in the transmitting part of the pixel region by the first and second coupling capacitors 128a and 128b. Accordingly, the reflective curve in the reflective part 114a of the pixel region 114 is normalized to be matched with the transmitting curve of the transmitting part, so that it is possible to realize the uniform gray scale in the reflective part 114a and the transmitting part 114b of the pixel region 114 formed as the single cell gap.

As mentioned above, the transflective type liquid crystal display panel according to the present invention and the method of fabricating the same has the following advantages.

In the transflective type liquid crystal display panel according to the present invention, the reflective curve and the transmitting curve are matched up through the coupling capacitor formed in the reflective part of the pixel region, thereby realizing the uniform gray scale in the reflective and transmitting parts of the pixel region.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A transflective type liquid crystal display panel comprising:
   a gate line on a substrate;
   a data line crossing the gate line to define a pixel region comprised of a transmitting part and a reflective part;
   a thin film transistor adjacent to a crossing of the gate and data lines;
   a first insulation film on a passivation film covering the thin film transistor;
   a reflective electrode in the reflective part of the pixel region, for reflecting incident light;
   a pixel electrode formed on a second insulation film covering the reflective electrode, and connected to a drain electrode of the thin film transistor via a contact hole; and
   a coupling capacitor for matching a reflective curve of the reflective part with a transmitting curve of the transmitting part by normalizing the reflective curve of reflective part according to a data voltage supplied from the drain electrode.

2. The transflective type liquid crystal display panel of claim 1, wherein the first insulation film is formed of an organic insulation material of photo-acryl.

3. The transflective type liquid crystal display panel of claim 1, wherein the second insulation film is formed of an inorganic insulation material.

4. The transflective type liquid crystal display panel of claim 1, wherein the coupling capacitor comprises:
   a first coupling capacitor including the reflective electrode, and the drain electrode overlapping with the reflective electrode in state of interposing the first insulation film therebetween; and
   a second coupling capacitor including the pixel electrode, and the reflective electrode overlapping with the pixel electrode in state of interposing the second insulation film therebetween.

5. The transflective type liquid crystal display panel of claim 4, wherein the first and second coupling capacitors are connected in parallel.

6. The transflective type liquid crystal display panel of claim 5, wherein electric capacity of the second coupling capacitor is varied based on an area of the pixel electrode formed in the reflective part.

7. A method of fabricating a transflective type liquid crystal display panel, comprising:
   forming a gate line on a substrate;
   forming a data line crossing the gate line to define a pixel region comprised of a transmitting part and a reflective part;
   forming a thin film transistor adjacent to a crossing of the gate and data lines;
   forming a first insulation film on a passivation film covering the thin film transistor;
   forming a reflective electrode in the reflective part of the pixel region, for reflecting incident light;
   forming a pixel electrode connected to a drain electrode of the thin film transistor via a contact hole included in the second insulation film covering the reflective electrode; and
   forming a coupling capacitor to normalize a reflective curve of the reflective part according to a data voltage supplied from the drain electrode, to be matched up with a transmitting curve of the transmitting part.

8. The method of claim 7, wherein the first insulation film is formed of an organic insulation material of photo-acryl.

9. The method of claim 7, wherein the second insulation film is formed of an inorganic insulation material.

10. The method of claim 1, wherein forming the coupling capacitor comprises:
    forming a first coupling capacitor including the reflective electrode, and the drain electrode overlapping with the reflective electrode in state of interposing the first insulation film therebetween; and
    forming a second coupling capacitor including the pixel electrode, and the reflective electrode overlapping with the pixel electrode in state of interposing the second insulation film therebetween.

11. The method of claim 10, wherein the first and second coupling capacitors are connected in parallel.

12. The method of claim 11, wherein electric capacity of the second coupling capacitor is varied based on an area of the pixel electrode formed in the reflective part.

* * * * *